(12) United States Patent
Ansari et al.

(10) Patent No.: US 8,769,231 B1
(45) Date of Patent: Jul. 1, 2014

(54) CROSSBAR SWITCH DEVICE FOR A PROCESSOR BLOCK CORE

(75) Inventors: Ahmad R. Ansari, San Jose, CA (US); Jeffery H. Appelbaum, San Mateo, CA (US); Kunal R. Shenoy, Newark, CA (US)

(73) Assignee: Xilinx, Inc., San Jose, CA (US)

( * ) Notice: Subject to any disclaimer, the term of this patent is extended or adjusted under 35 U.S.C. 154(b) by 913 days.

(21) Appl. No.: 12/182,934

(22) Filed: Jul. 30, 2008

(51) Int. Cl.
  G06F 12/00 (2006.01)
  G06F 3/06 (2006.01)
  G06F 13/16 (2006.01)
  G06F 13/00 (2006.01)

(52) U.S. Cl.
  CPC .............. G06F 3/0659 (2013.01); G06F 13/16 (2013.01)
  USPC ........... 711/167; 711/156; 711/158; 711/159; 710/317

(58) Field of Classification Search
  CPC ............................... G06F 13/16; G06F 3/0659
  USPC .................. 711/167, 159, 156, 158; 710/317
  See application file for complete search history.

(56) References Cited

U.S. PATENT DOCUMENTS

| | | | | |
|---|---|---|---|---|
| 5,418,911 A | * | 5/1995 | Zilka et al. | 710/316 |
| 5,598,568 A | * | 1/1997 | Frisch | 712/29 |
| 5,613,075 A | * | 3/1997 | Wade et al. | 710/107 |
| 5,936,640 A | * | 8/1999 | Horan et al. | 345/531 |
| 6,209,067 B1 | * | 3/2001 | Collins et al. | 711/158 |
| 6,715,023 B1 | * | 3/2004 | Abu-Lebdeh et al. | 710/317 |

OTHER PUBLICATIONS

U.S. Appl. No. 12/043,097, filed Mar. 5, 2008, Ansari, Ahmad R., et al., entitled "A Processor Block Asic Core for Embedding in an Integrated Circuit", Xilinx, Inc. 2100 Logic Drive, San Jose, California 95124.
IBM Doc. No. SA-14-2538-04, "128-bit Processor Local Bus Architecture Specifications", Ver. 4.6, Jul. 2004, 184 pages.
UG200 (v1.0), "Embedded Processor Block in Virtex-5 FPGAs", Jan. 15, 2008, 323 pages, Xilinx, Inc. 2100 Logic Drive, San Jose, CA 95124.
UG200 (v1.1), "Embedded Processor Block in Virtex-5 FPGAs", Mar. 31, 2008, 327 pages, Xilinx, Inc. 2100 Logic Drive, San Jose, CA 95124.

* cited by examiner

*Primary Examiner* — Stephen Elmore
*Assistant Examiner* — Mark Giardino, Jr.
(74) *Attorney, Agent, or Firm* — W. Eric Webostad

(57) ABSTRACT

A crossbar switch device for a processor block ASIC core and a method for a flush-posted-write(s)-before-read mode thereof are described. Operation for the flush-posted-write (s)-before-read mode is set in a first processor block interface coupled to programmable logic fabric. At least one write command is sent from a transaction initiating device instantiated using the programmable logic fabric to the first processor block interface. The at least one write command is posted in the first processor block interface. At least one write command received is stored in a command queue of the crossbar switch device. A read command initiated by a microprocessor is sent to the crossbar switch device. The at least one write command has an address overlap with the read command with respect to a destination target. The read command is temporarily blocked in the crossbar switch device until a command phase of the at least one write command is completed.

18 Claims, 10 Drawing Sheets

CROSSBAR SWITCH DEVICE FOR A PROCESSOR BLOCK CORE

FIELD OF THE INVENTION

The invention relates to integrated circuit devices ("ICs"). More particularly, one or more aspects generally relate to a crossbar switch device for a processor block Application Specific Integrated Circuit ("ASIC") core embedded in an IC.

BACKGROUND

Programmable logic devices ("PLDs") are a well-known type of integrated circuit that can be programmed to perform specified logic functions. One type of PLD, the field programmable gate array ("FPGA"), conventionally includes an array of programmable tiles. These programmable tiles can include, for example, input/output blocks ("IOBs"), configurable logic blocks ("CLBs"), dedicated random access memory blocks ("BRAMs"), multipliers, digital signal processing blocks ("DSPs"), processors, clock managers, delay lock loops ("DLLs"), and so forth. As used herein, "include" and "including" mean including without limitation.

Each programmable tile conventionally includes both programmable interconnect and programmable logic. The programmable interconnect conventionally includes a large number of interconnect lines of varying lengths interconnected by programmable interconnect points ("PIPs"). The programmable logic implements the logic of a user design using programmable elements that can include, for example, function generators, registers, arithmetic logic, and so forth.

The programmable interconnect and programmable logic conventionally may be programmed by loading a stream of configuration data into internal configuration memory cells that define how the programmable elements are configured. The configuration data can be read from memory (e.g., from an external non-volatile memory, such as flash memory or read-only memory) or written into the FPGA by an external device. The collective states of the individual memory cells then determine the function of the FPGA.

Another type of PLD is the Complex Programmable Logic Device, or CPLD. A CPLD includes two or more "function blocks" connected together and to input/output ("I/O") resources by an interconnect switch matrix. Each function block of the CPLD includes a two-level AND/OR structure similar to those used in Programmable Logic Arrays ("PLAs") and Programmable Array Logic ("PAL") devices. In CPLDs, configuration data is conventionally stored on-chip in non-volatile memory. In some CPLDs, configuration data is stored on-chip in non-volatile memory, then downloaded to volatile memory as part of an initial configuration ("programming") sequence.

For all of these programmable logic devices ("PLDs"), the functionality of the device is controlled by data bits provided to the device for that purpose. The data bits can be stored in volatile memory (e.g., static memory cells, as in FPGAs and some CPLDs), in non-volatile memory (e.g., FLASH memory, as in some CPLDs), or in any other type of memory cell.

Other PLDs are programmed by applying a processing layer, such as a metal layer, that programmably interconnects the various elements on the device. These PLDs are known as mask programmable devices. PLDs can also be implemented in other ways, e.g., using fuse or antifuse technology. The terms "PLD" and "programmable logic device" include but are not limited to these exemplary devices, as well as encompassing devices that are only partially programmable. For example, one type of PLD includes a combination of hard-coded transistor logic and a programmable switch fabric that programmably interconnects the hard-coded transistor logic.

Conventionally, embedded processors are designed apart from the PLDs. Such embedded processors are generally not specifically designed for implementation in PLDs, and thus such embedded processors may have operating frequencies that significantly exceed a maximum operating frequency of programmable logic of such PLDs. Moreover, parameters designed into the embedded processors, such as latency, transistor gate delay, data throughput, and the like, may be assumed to be present in the environment to which the embedded processors are to be coupled. Thus even though a PLD may include an embedded processor, such one or more operating parameters of the embedded processor may be substantially disparate from those of programmable logic of the PLD.

For purposes of clarity by way of example and not limitation, an FPGA with an embedded processor is described; however, it should be appreciated that other PLDs, as well as other integrated circuits with programmable logic or other circuitry fabric with less performance than the embedded processor, may likewise be used in accordance with the following description.

Performance of a design instantiated in programmable logic of an FPGA ("FPGA fabric") coupled to an embedded processor may be significantly limited by disparity between operating parameters of the FPGA fabric and those of the embedded processor. Thus, if, as in the past, embedded processor interfaces such as processor local bus ("PLB") interfaces are brought directly out to FPGA fabric, disparity between respective operating parameters of the embedded processor and the FPGA fabric is a significant limitation with respect to overall performance. For example, operations between a memory controller instantiated in FPGA fabric and an embedded processor have heretofore been significantly bottlenecked due to having to wait on the slower memory controller.

Alternatively, to enhance performance, a memory controller instantiated in FPGA fabric may be hardened or provided as an ASIC core coupled to the embedded processor. By hardening a circuit instantiated in FPGA fabric, it is generally meant replacing or bypassing configuration memory cells with hardwired or dedicated connections. Even though the example of a memory controller is used, it should be understood that other peripherals may be hardened or provided as ASIC cores for coupling to an embedded processor. However, as the memory controller or peripheral ASIC or hardened core is not configurable, this reduces overall flexibility. For purposes of clarity by way of example and not limitation, ASIC cores are described even though hardened cores instantiated in FPGA fabric may also be used.

Semiconductor processes and semiconductor process integration rules ("semiconductor process design rules") associated with ASICs are generally more challenging than those associated with FPGAs, and thus yield for such ASICs may be relatively low as compared to yield of FPGAs of the same size. FPGAs, which may have a larger and longer run rate than ASICs, may employ semiconductor process design rules that are less aggressive but are more conducive to a higher die per wafer yield than that of ASICs.

It should be understood that an FPGA manufactured with an ASIC core uses FPGA semiconductor process design rules. Thus, ASIC cores manufactured in FPGAs perform worse than such ASIC cores manufactured as standalone ASICs using more aggressive ASIC semiconductor process design rules. Thus, manufacturing FPGAs with ASIC cores conventionally will not achieve competitive performance with standalone ASICs.

For FPGAs provided with ASIC cores that take the place of some FPGA fabric resources, users conventionally are locked into the particular offering of ASIC core memory controllers or peripherals, and have less flexibility of design due to fewer FPGA fabric resources for implementing their circuit design. This loss of flexibility combined with the fact that such ASIC core memory controllers or peripherals implemented in FPGA fabric may make FPGAs less attractive to users.

Accordingly, it would be desirable and useful to enhance performance of FPGAs without a significant loss of design flexibility associated with adding an ASIC core.

SUMMARY OF THE INVENTION

One or more aspects generally relate to a crossbar switch associated with a processor block Application Specific Integrated Circuit ("ASIC") core embedded in an IC.

An aspect relates generally to a method for a flush-posted-write(s)-before-read mode. Operation for the flush-posted-write(s)-before-read mode is set in a first processor block interface coupled to programmable logic fabric. At least one write command is sent from a transaction initiating device instantiated using the programmable logic fabric to the first processor block interface. The at least one write command is posted in the first processor block interface. At least one write command received is stored in a command queue of a crossbar switch device. A read command initiated by a microprocessor is sent to the crossbar switch device. The at least one write command has an address overlap with the read command with respect to a destination target. The read command is temporarily blocked in the crossbar switch device until a command phase of the at least one write command is completed.

Another aspect relates generally to another method for a flush-posted-write(s)-before-read mode. Operation for the flush-posted-write(s)-before-read mode is in a first processor block interface. At least one write command sent from a first transaction initiating device to the first processor block interface via programmable logic interconnects. The at least one write command is stored in a command queue of the first processor block interface. The at least one write command is sent from the first processor block interface to a crossbar switch device coupled thereto. A read command is sent from a second transaction initiating device coupled to the crossbar switch device via a second processor block interface. The read command received is stored in a command queue of the second processor block interface. The at least one write command has an address overlap with the read command with respect to a destination target. The read command is temporarily blocked in the second processor block interface until a command phase of the at least one write command is completed.

Yet another aspect relates generally to a method for processing a synchronous transaction. Access is gained to a crossbar switch device by a transaction initiating device. The synchronous transaction is requested by the transaction initiating device. All requests from other transaction initiating devices that are subsequent to the synchronous transaction are blocked until completion of the synchronous transaction.

BRIEF DESCRIPTION OF THE DRAWINGS

Accompanying drawing(s) show exemplary embodiment(s) in accordance with one or more aspects of the invention; however, the accompanying drawing(s) should not be taken to limit the invention to the embodiment(s) shown, but are for explanation and understanding only.

DETAILED DESCRIPTION

In the following description, numerous specific details are set forth to provide a more thorough description of the specific embodiments of the invention. It should be apparent, however, to one skilled in the art, that the invention may be practiced without all the specific details given below. In other instances, well known features have not been described in detail so as not to obscure the invention. For ease of illustration, the same number labels are used in different diagrams to refer to the same items; however, in alternative embodiments the items may be different.

Figure 1:
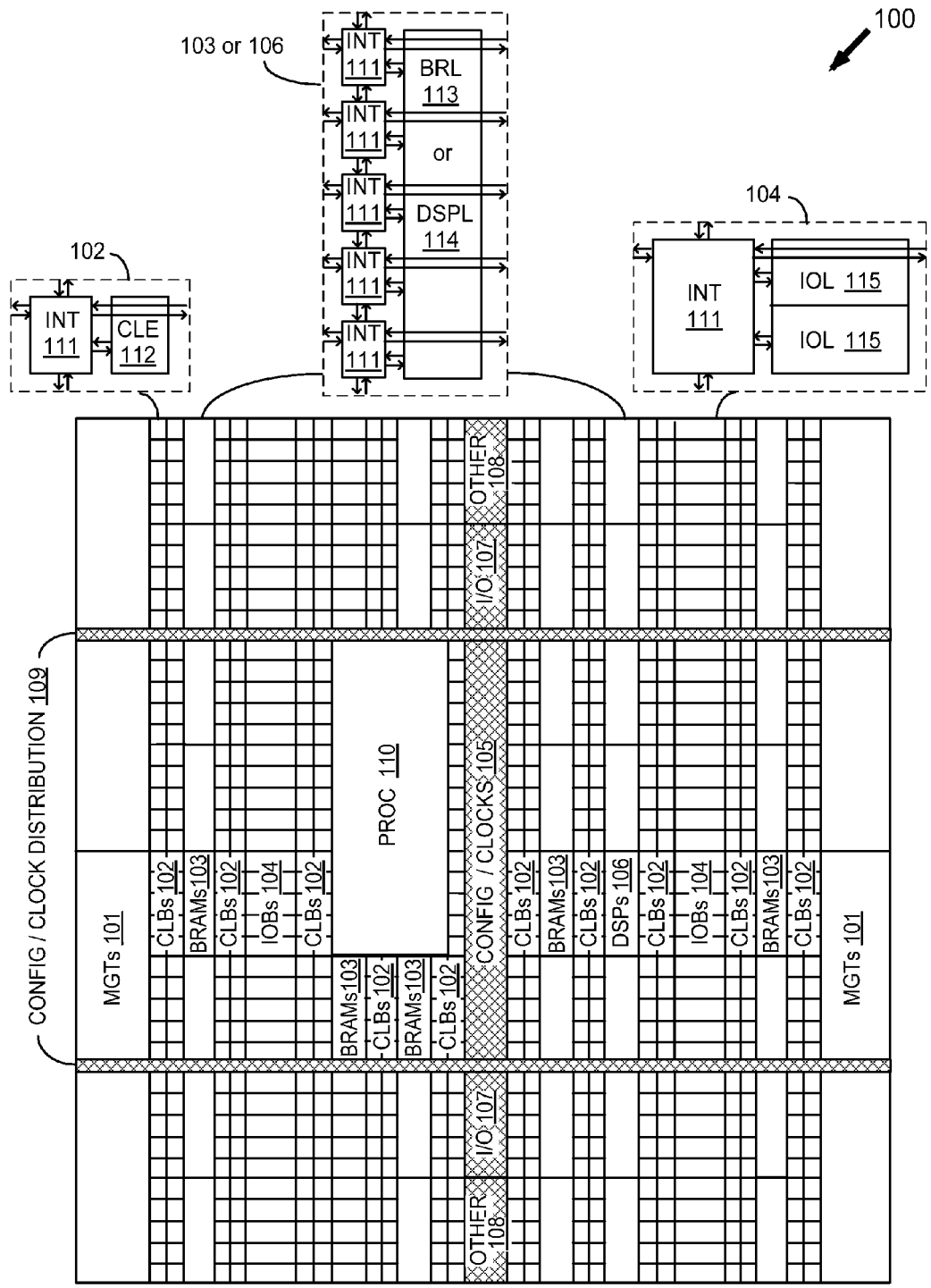
FIG. 1 is a simplified block diagram depicting an exemplary embodiment of a columnar Field Programmable Gate Array ("FPGA") architecture in which one or more aspects of the invention may be implemented.

As noted above, advanced FPGAs can include several different types of programmable logic blocks in the array. For example, FIG. 1 illustrates an FPGA architecture 100 that includes a large number of different programmable tiles including multi-gigabit transceivers ("MGTs") 101, configurable logic blocks ("CLBs") 102, random access memory blocks ("BRAMs") 103, input/output blocks ("IOBs") 104, configuration and clocking logic ("CONFIG/CLOCKS") 105, digital signal processing blocks ("DSPs") 106, specialized input/output blocks ("I/O") 107 (e.g., configuration ports and clock ports), and other programmable logic 108 such as digital clock managers, analog-to-digital converters, system monitoring logic, and so forth. Some FPGAs also include dedicated processor blocks ("PROC") 110.

In some FPGAs, each programmable tile includes a programmable interconnect element ("INT") 111 having standardized connections to and from a corresponding interconnect element in each adjacent tile. Therefore, the programmable interconnect elements taken together implement the programmable interconnect structure for the illustrated FPGA. The programmable interconnect element 111 also includes the connections to and from the programmable logic element within the same tile, as shown by the examples included at the top of FIG. 1.

For example, a CLB 102 can include a configurable logic element ("CLE") 112 that can be programmed to implement user logic plus a single programmable interconnect element ("INT") 111. A BRAM 103 can include a BRAM logic element ("BRL") 113 in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 106 can include a DSP logic element ("DSPL") 114 in addition to an appropriate number of programmable interconnect elements. An IOB 104 can include, for example, two instances of an input/output logic element ("IOL") 115 in addition to one instance of the programmable interconnect element 111. As will be clear to those of skill in the art, the actual I/O pads connected, for example, to the I/O logic element 115 typically are not confined to the area of the input/output logic element 115.

In the pictured embodiment, a columnar area near the center of the die (shown in FIG. 1) is used for configuration, clock, and other control logic. Horizontal areas 109 extending from this column are used to distribute the clocks and configuration signals across the breadth of the FPGA.

Some FPGAs utilizing the architecture illustrated in FIG. 1 include additional logic blocks that disrupt the regular columnar structure making up a large part of the FPGA. The additional logic blocks can be programmable blocks and/or dedicated logic. For example, processor block 110 spans several columns of CLBs and BRAMs.

Note that FIG. 1 is intended to illustrate only an exemplary FPGA architecture. For example, the numbers of logic blocks in a column, the relative width of the columns, the number and order of columns, the types of logic blocks included in the columns, the relative sizes of the logic blocks, and the interconnect/logic implementations included at the top of FIG. 1 are purely exemplary. For example, in an actual FPGA more than one adjacent column of CLBs is typically included wherever the CLBs appear, to facilitate the efficient implementation of user logic, but the number of adjacent CLB columns varies with the overall size of the FPGA.

As FPGA designs increase in complexity, they reach a point at which the designer cannot deal with the entire design at the gate level. Where once a typical FPGA design comprised perhaps 5,000 gates, FPGA designs with over 100,000 gates are now common. To deal with this complexity, circuits are typically partitioned into smaller circuits that are more easily handled. Often, these smaller circuits are divided into yet smaller circuits, imposing on the design a multi-level hierarchy of logical blocks.

Libraries of pre-developed blocks of logic have been developed that can be included in an FPGA design. Such library modules include, for example, adders, multipliers, filters, and other arithmetic and DSP functions from which complex designs can be readily constructed. These pre-developed logic blocks are in the form of coded text that may be instantiated in programmable logic of the FPGA. The use of pre-developed logic blocks permits faster design cycles, by eliminating the redesign of duplicated circuits. Further, such blocks are typically well tested, thereby making it easier to develop a reliable complex design.

Thus, some FPGAs, such as the Virtex-5™ FGPA available from Xilinx, Inc. of San Jose, Calif., can be programmed to incorporate pre-developed logic blocks with pre-designed functionalities, i.e., "soft cores." A soft core can include a predetermined set of configuration bits that program the FPGA to perform one or more functions. Alternatively, a soft core can include source code or schematics that describe the logic and connectivity of a design. Typical soft cores can provide, but are not limited to, DSP functions, memories, storage elements, and math functions. Some soft cores include an optimally floor-planned layout targeted to a specific family of FPGAs. Soft cores can also be parameterizable, i.e., allowing the user to enter parameters to activate or change certain soft core functionality.

A set or sets of configuration bits used to program programmable logic of an FPGA is conventionally referred to as a configuration bitstream. Programmable logic of an FPGA may include CLBs, PIPs, IOBs, or other programmably configurable logic blocks, interconnects, or inputs/outputs by a configuration bitstream. Register settings may be set via a configuration bitstream; however, hardwired registers are not programmable logic.

Moreover, a hardwired core, such as an ASIC core, is not a soft core. A soft core is instantiated in programmable logic after manufacture of an integrated circuit, whereas a hardwired core is manufactured as part of an integrated circuit. Furthermore, conventionally a hardwired core is thought of as having generally dedicated logic blocks, interconnects, and inputs/outputs, even though a portion of a hardwired core may be set to operate responsive to register settings.

Figure 2:
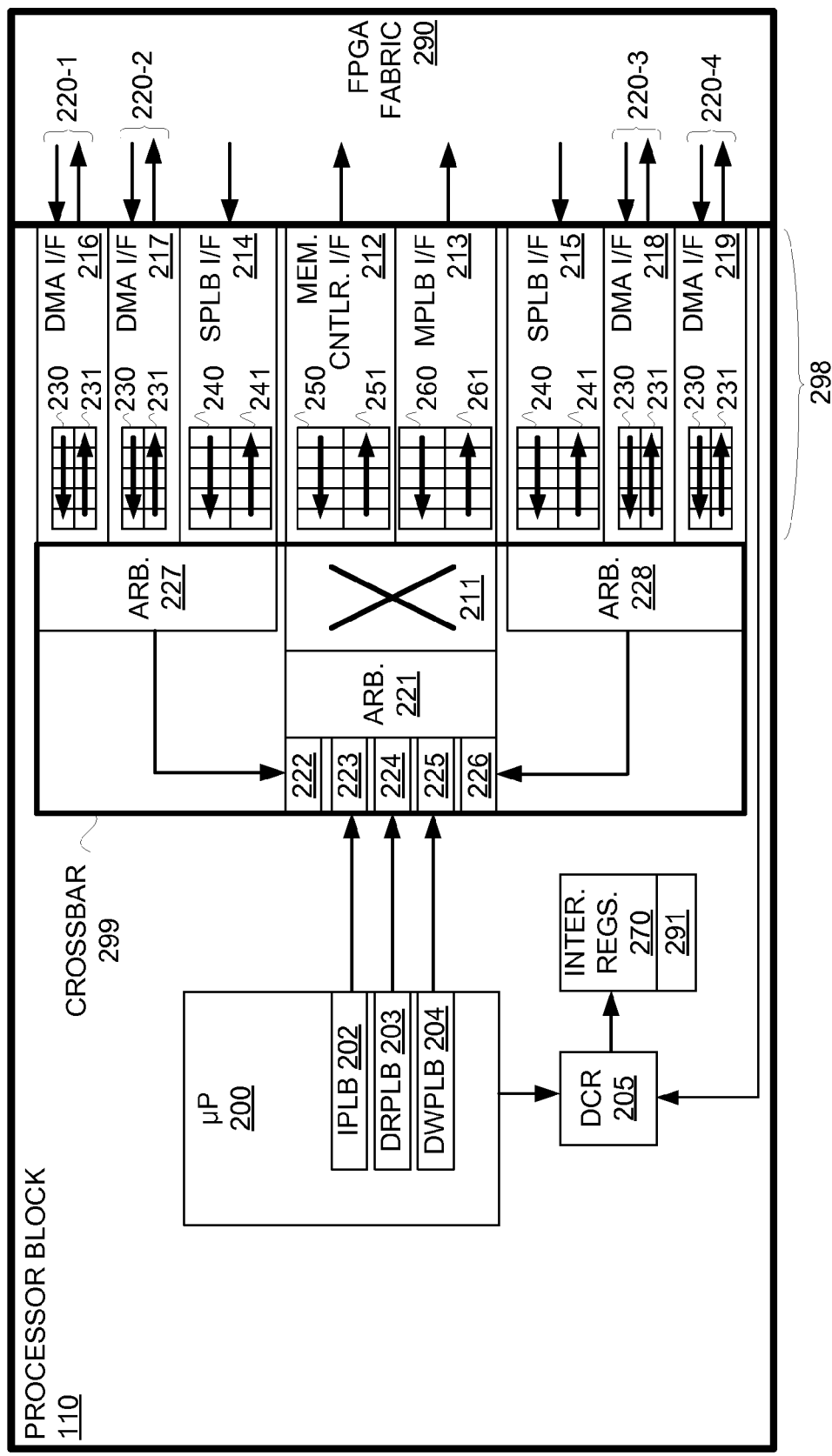
FIG. 2 is a block diagram depicting an exemplary embodiment of an ASIC processor block core ("processor block") embedded in the FPGA of FIG. 1, in accordance with an embodiment of the present invention.

FIG. 2 is a block diagram depicting an exemplary embodiment of an ASIC processor block core ("processor block") 110. Processor block 110 includes an embedded microprocessor core, namely microprocessor 200, which is generally hardwired and designed apart from the FPGA, such as FPGA 100 of FIG. 1, in which processor block 110 may be located.

Microprocessor 200 in this exemplary embodiment includes an instruction processor local bus ("IPLB") 202, a data read PLB ("DRPLB") 203, and a data write PLB ("DWPLB") 204. In this exemplary embodiment, microprocessor 200 is a Power PC, or more particularly a 440 Power PC, available from IBM. However, from the following description, it should be appreciated that other types of microprocessors with other types of interfaces may be used. Moreover, from the following description, it should be appreciated that an ASIC core other than a microprocessor ASIC core may be used.

Components of processor block 110 are generally hardwired such that their performance exceeds that of programmable logic of FPGA fabric 290 to which processor block 110 is coupled. Processor block 110 includes registers, such as internal registers 270, which may be set in order to condition processor block 110 for any of a variety of user selectable configurations, as described below in additional detail.

A device control register block ("DCR") 205 may be coupled to microprocessor core 200 and may be part of processor block 110. DCR 205 may be used to provide settings to registers controlled by microprocessor core 200 or other registers subject to control by DCR block 205. DCR block 205 may be used to set registers of internal registers 270.

Arrows in FIG. 2 indicate the direction of a transaction. Thus, for example, register input provided to DCR 205 may be from a transaction initiated by microprocessor 200 or from a master device (not shown for purposes of clarity). One or more master devices, other than microprocessor 200, may be instantiated in FPGA fabric 290, may be other ASIC cores of FPGA 100, or may be external ICs coupled to FPGA 100, or any combination thereof. Such master devices external to processor block 110 may be coupled thereto via a direct memory access ("DMA") interface block, such as DMA interface blocks ("DMA interfaces") 216 through 219, or a slave PLB interface block ("SPLB interface"), such as SPLB interfaces 214 and 215, or a fabric interface to DCR 205. Thus, with respect to transaction origination, DMA interfaces 216 through 219 and SPLB interfaces 214 and 215 may generally be thought of as FPGA fabric 290-to-crossbar 299 bridges, and memory controller interface block ("memory controller interface") 212 and master PLB interface block ("MPLB interface") 213 may generally be thought of as crossbar 299-to-FPGA fabric 290 bridges. DMA interfaces 216 and 219 may be coupled to FPGA fabric by local links 220-1 through 220-4, respectively, as described in additional detail below. DMA interfaces 216 through 219, SPLB interfaces 214 and 215, memory controller interface 212, and MPLB interface 213 are collectively referred to herein as "interfaces 298."

Transactions may be initiated by microprocessor 200 as indicated by arrows respectively from IPLB 202, DRPLB 203, and DWPLB 204. However, it should be understood that a transaction issued by microprocessor 200 may result in data being provided to microprocessor 200 responsive to such an issued transaction.

A crossbar 299 is part of processor block 110. Crossbar 299 includes address decoder blocks ("decoders") 222 through 226, arbitration block ("arbiter") 221, crossbar switch ("switch") 211, and arbitration blocks ("arbiters") 227 and 228. IPLB 202, DRPLB 203, and DWPLB 204 are respectively coupled to decoders 223 through 225. Decoders 222 through 226 are respectively coupled to arbiter 221. Arbiter 221 is coupled to switch 211. Decoders 222 through 226 decode addresses associated with transactions, and transactions with decoded addresses are provided to arbiter 221 for arbitrating access to switch 211. The decoded addresses for transactions having been granted access to switch 211 are used to route such transactions to memory controller interface 212 or MPLB interface 213.

Memory controller interface 212 and MPLB interface 213 are both part of processor block 110. One or more of SPLB interfaces 214 and 215 are part of processor block 110, and one or more of DMA interfaces 216 through 219 may optionally be part of processor block 110.

Crossbar switch 211 is coupled to memory controller interface 212 and MPLB interface 213. Memory controller interface 212 may be coupled to FPGA fabric 290. Likewise, MPLB interface 213 may be coupled to FPGA fabric 290. Thus, for example, microprocessor 200 may issue an instruction transaction, a read transaction, or a write transaction which is respectively decoded by decoder 223, 224, or 225 to provide target addresses, which may be for either or both memory controller interface 212 or MPLB interface 213. A decoded address is used by switch 211 once access to switch 211 for such decoded address is granted by arbiter 221. Thus, switch 211 responsive to a decoded address provides such address for example to memory controller interface 212 to access a memory controller device coupled thereto or to MPLB interface 213 to access a peripheral device coupled thereto.

Memory controller interface 212 includes an inbound first-in, first-out buffer ("FIFO") 250 and an outbound FIFO 251. MPLB interface 213 includes an inbound FIFO 260 and an outbound FIFO 261. Each SPLB interface 214 and 215 includes a respective inbound FIFO 240 and an outbound FIFO 241. Lastly, each DMA interface 216 through 219 includes a respective inbound FIFO 230 and outbound FIFO 231. Thus, even though the direction of a transaction is directed to memory controller interface 212 or MPLB interface 213 such as originating from microprocessor 200 or FPGA fabric 290, it should be appreciated that data or other information flow associated with such a transaction may be in either or both input and output directions. Thus, crossbar 299 is bidirectional, as described below in additional detail.

Because processor block 110 is an ASIC core, blocks of processor block 110 that couple to microprocessor 200 may be tailored for interoperability as well as performance. Focusing on communication between microprocessor 200 and memory external to processor block 110, memory controller interface 212 is designed and implemented to operate at a rated speed of microprocessor 200. However, memory controller interface may be designed and implemented to operate at approximately ⅔ a maximum frequency of operation of microprocessor 200. Moreover, because of hardwiring associated with an ASIC core, it should be appreciated that latency associated with signal propagation in crossbar 299 and memory controller interface 212 is substantially less than latency associated with FPGA fabric 290. In other words, by providing an ASIC core with memory controller interface 212 coupled to microprocessor 200, frequency of operation has been increased with a reduction in latency as compared with having microprocessor 200 directly coupled to FPGA fabric 290.

PLBs of microprocessor 200 are optionally extended to FPGA fabric 290 via ASIC circuitry provided as one or more of SPLB interfaces 214 and 215 and a MPLB interface 213. However, this is not a mere extension of PLBs of microprocessor 200, because the ASIC circuitry is not merely an extension of wires, but performs additional functions.

Order of transactions from a master is preserved via pipelines and buffers, including one or more command buffers. For example, a command buffer (not shown in FIG. 2 for purposes of clarity) may be for multiple transactions targeted to memory controller interface 212 for example. Likewise, order of transactions is preserved via pipelines and buffers, including another command buffer (not shown in FIG. 2 for purposes of clarity) for multiple transactions targeted to MPLB interface 213 for example. The side of MPLB interface 213 associated with FPGA fabric 290 is not a FIFO-based protocol, but rather is an address/data transaction protocol with a data phase and an address phase.

In addition to memory controller interface 212, which is configurable for a user-specified memory protocol, and MPLB interface 213, which uses a PLB protocol with bidirectional read and write busing, there are additional blocks that increase the interface bandwidth of processor block 110. These additional blocks may include one or more of DMA interfaces 216 through 219 and include one or more of SPLB interfaces 214 and 215. Again, each of DMA interfaces 216 through 219 includes an inbound FIFO 230 and an outbound FIFO 231, and each of SPLB interfaces 214 and 215 includes an inbound FIFO 240 and an outbound FIFO 241.

In this exemplary embodiment, DMA interfaces 216 and 217 and SPLB interface 214 are grouped together for access to decoder 222 via arbiter 227. Likewise, DMA interfaces 218 and 219 and SPLB interface 215 are grouped together for access to decoder 226 via arbiter 228. It should be appreciated that DMA protocols and PLB protocols may be used for coupling to any of a variety of peripheral devices. In this exemplary embodiment, DMAs 216 through 219 are coupled to local links 220-1 through 220-4, respectively. Each local link is a parallel but unidirectional communication bus. In other words, in this exemplary embodiment there are four output local links and four input local links. Input or receive local links may be associated with FIFOs 230 and output or transmit local links may be associated with FIFOs 231. Transmit local links are independent of their associated receive local links. A local link is described in additional detail in documentation from Xilinx, Inc., and for purposes of this description may be understood to be a synchronous peer-to-peer unidirectional communication linkage.

In the exemplary embodiment of processor block 110, crossbar 299 is a five-to-two crossbar. In other words, there are five ports, respectively associated with decoders 222 through 226, for coupling to two blocks, respectively memory controller interface 212 and MPLB interface 213. Alternatively, a nine-to-two crossbar or some other crossbar configuration may be used; however, for reasons of anticipated utilization and relative clock rates, a five-to-two crossbar 299 is illustratively shown.

FIFOs of processor block 110 facilitate processing transactions concurrently by pipelining such transactions. As described below in additional detail, switch 211 is a non-blocking crossbar switch, and once access is granted to switch 211 execution happens immediately. Moreover, performance level of memory controller interface 212 is substantially greater than circuits instantiated in CLBs or other programmable logic of FPGA fabric 290.

A master device, for example instantiated in FPGA fabric 290 or another ASIC core of FPGA 100, may be coupled to processor block 110 via an SPLB interface of SPLB interfaces 214 or 215 or a DMA interface of DMA interfaces 216 through 219. Memory controller interface 212 may be thought of as having only one slave device coupled to it, namely memory coupled to it via a memory controller. Furthermore, such a memory controller for interfacing to memory may be substantially simplified as the physical layer of such memory controller may be directly coupled with memory controller interface 212. MPLB interface block 213, however, is not limited to a single slave device, but may have multiple slave devices coupled to it.

Other master devices, such as other ASIC cores, other processors whether instantiated in FPGA fabric 290 or as ASIC cores, or other circuits whether ASIC cores or instantiated in FPGA fabric 290, may be coupled to processor block 110 via any of DMA interfaces 216 through 219 or SPLB interfaces 214 or 215. It is not necessary that all transactions proceed to memory via memory controller interface 212. Thus, a master device may be coupled for example to DMA interface 216 for executing a transaction utilizing a slave device, which may be a memory controller or a peripheral device, coupled to MPLB interface 213. Moreover, a master device coupled to SPLB interface 215 may issue a transaction for a slave device coupled to MPLB interface 213. It should, however, be understood that transactions from master devices coupled to any of DMA interfaces 216 through 219 or any of SPLB interfaces 214 and 215 go into crossbar 299 and then to either memory controller interface 212 or MPLB interface 213 to a memory controller or to one or more other slave devices, respectively, coupled thereto. Moreover, transactions may go from FPGA fabric 290 to memory controller interface 212 or MPLB interface 213 and then to any of local links 220-1 through 220-4 via DMA interfaces 216 through 219, respectively. Again, arrows indicate direction in which transactions are initiated in FIG. 2. In short, transactions go into and out of crossbar 299 and interfaces 298 of processor block 110, and thus crossbar 299 and interfaces 298 in combination may be thought of as a bridge or bridges.

SPLB interfaces 214 and 215 in combination with MPLB interface 213 support address pipelining. Thus, if a transaction is stalled, other transactions may be stacked up behind it in an output command queue of crossbar 299. There are two output command queues of crossbar 299, namely one for reads and one for writes to allow concurrent read and write transactions as described below in additional detail. Commands waiting in output command queues have completed an address decode phase, and may be waiting on a data phase to begin. At the completion of a data phase for a current command being processed, a next command in a command queue has its data phase initiated, and successive data phases may be initiated without any "dead" cycle between them. It should be understood that outbound FIFOs 251 and 261 facilitate pipelining for adaptation to availability and relative transaction speed of slave devices coupled to memory controller interface 212 and MPLB interface 213, Microprocessor 200 is a master device, as it issues transactions for other devices. Furthermore, it should be appreciated that any transactions which originate via a master device coupled to any of DMA interfaces 216 through 219 or SPLB interfaces 214 and 215 or via microprocessor 200 exit processor block 110.

Part of this implementation involves having interface blocks, such as DMA interfaces 216 through 219 and SPLB interfaces 214 and 215, accumulate a threshold amount of data before being granted access to switch 211. Local links 220-1 through 220-4 are dedicated interfaces, not soft buses, and there is no address mapping for local links 220-1 through 220-4. There is flow control signaling for local links 220-1 through 220-4, such as ready/not ready signaling.

DMA interfaces 216 through 219 and SPLB interfaces 214 and 215 are masters on the crossbar. SPLB interfaces 214 and 215 have coupled to them a master device, which is external to processor block 110, such as may be instantiated in FPGA fabric 290. However, memory controller interface 212 and MPLB interface 213 are "slave" interfaces with respect to microprocessor 200, DMA interfaces 216 through 219, and SPLB interfaces 214 and 215, as memory controller interface 212 and MPLB interface 213 each service microprocessor 200, and one or more master devices coupled via DMA interfaces 216 through 219 or SPLB interfaces 214 and 215.

Memory controller interface 212 and MPLB interface 213 are master interfaces with respect to "slave" devices coupled thereto via buses external to processor block 110. DMA interfaces 216 through 219 are scatter-gather DMA interfaces. Arbiters 227 and 228 may be implemented as round robin arbiters. Thus, for example, arbiter 227 may select any of DMA interface 216, DMA interface 217, or SPLB interface 214 in a round robin format. However, for SPLB interfaces 214 and 215 to have a right to request access to switch 211, SPLB interfaces 214 and 215 have stored therein a set threshold amount of data ready to be exchanged across switch 211. The threshold level of data may be set by a user. For DMA interfaces 216 through 219, this threshold level of data is not user settable, but rather is fixed by DMA protocol.

Register address mapping is configurable for processor block 110, namely for accessing either memory controller interface 212 or MPLB interface 213. Addresses are input to decoders 222 through 226. More particularly, after arbitration via arbiter 227 or 228, an address associated with a transaction to be provided to either memory controller interface 212 or MPLB interface 213 is decoded by decoder 222 or 226, respectively. It should be appreciated that address decoding may be performed before arbitration by arbiter 221, namely address decoding is performed by decoders 222 through 226 before crossbar arbitration by arbiter 221. Additionally, as part of the decoding is to select between memory controller interface 212 or MPLB interface 213, there may be additional decoding of an address within the selected interface, namely an address for a slave device coupled to memory controller interface 212 or MPLB interface 213. A decoded address may be provided to arbiter 221 for providing access to switch 211. Arbiter 221 may be configured by user selection for any of a variety of arbitration protocols responsive to register input. Examples of such arbitration protocols include round robin, fixed, and least recently used; however, other arbitration protocols may be used. Arbitration by arbiter 221 and decoding by decoders 222 through 226 may be performed with some degree of parallelism to facilitate a one clock cycle latency.

Crossbar 299 provides a non-blocking interconnection. By "non-blocking," it is meant that two different master devices may access two different slave devices simultaneously. For example, one of DMA interfaces 216 through 219 may access memory controller interface 212 simultaneously while microprocessor 200 accesses MPLB interface 213. However, multiple master devices may have multiple transactions that are pipelined to a single interface, such as either or both of interfaces 212 and 213.

Memory mapping may be done with a configuration bitstream to set register values. These register values may be set in internal registers 270. Alternatively, rather than or in addition to setting register values using a configuration bitstream, DCR operations may be used to set register values. However, memory mapping for some user designs may not change, and thus setting register values by configuration bitstream may be sufficient in some applications. Each of memory controller interface 212 and MPLB interface 213 may thus be address programmable.

Moreover, this memory mapping is flexible. It should be understood that because address spaces for a user design to be instantiated into FPGA fabric 290 may vary from user to user, such address spaces are not fixed. Rather, a user may program the memory map for processor block 110 via a configuration bitstream, or alternatively via DCR 205. However, programmed memory address spaces may be changed via DCR 205 after programming via a configuration bitstream. An example of memory mapping may include setting an address in a memory map of memory controller interface 212 for booting microprocessor 200 from flash memory located at such address and coupled to memory controller interface 212. Another example of memory mapping may be setting a portion of the memory address range that may be mapped to MPLB interface 213 for accessing peripherals.

Additionally, default values for configuration of internal registers 270 of processor block 110 may be programmed into configuration memory cells 291 coupled to internal registers 270. Such default values may be programmed into memory cells 291 via a configuration bitstream. Thus, immediately upon a reset of processor block 110, default values may be loaded from memory cells 291 into configuration registers 270.

Figure 3:
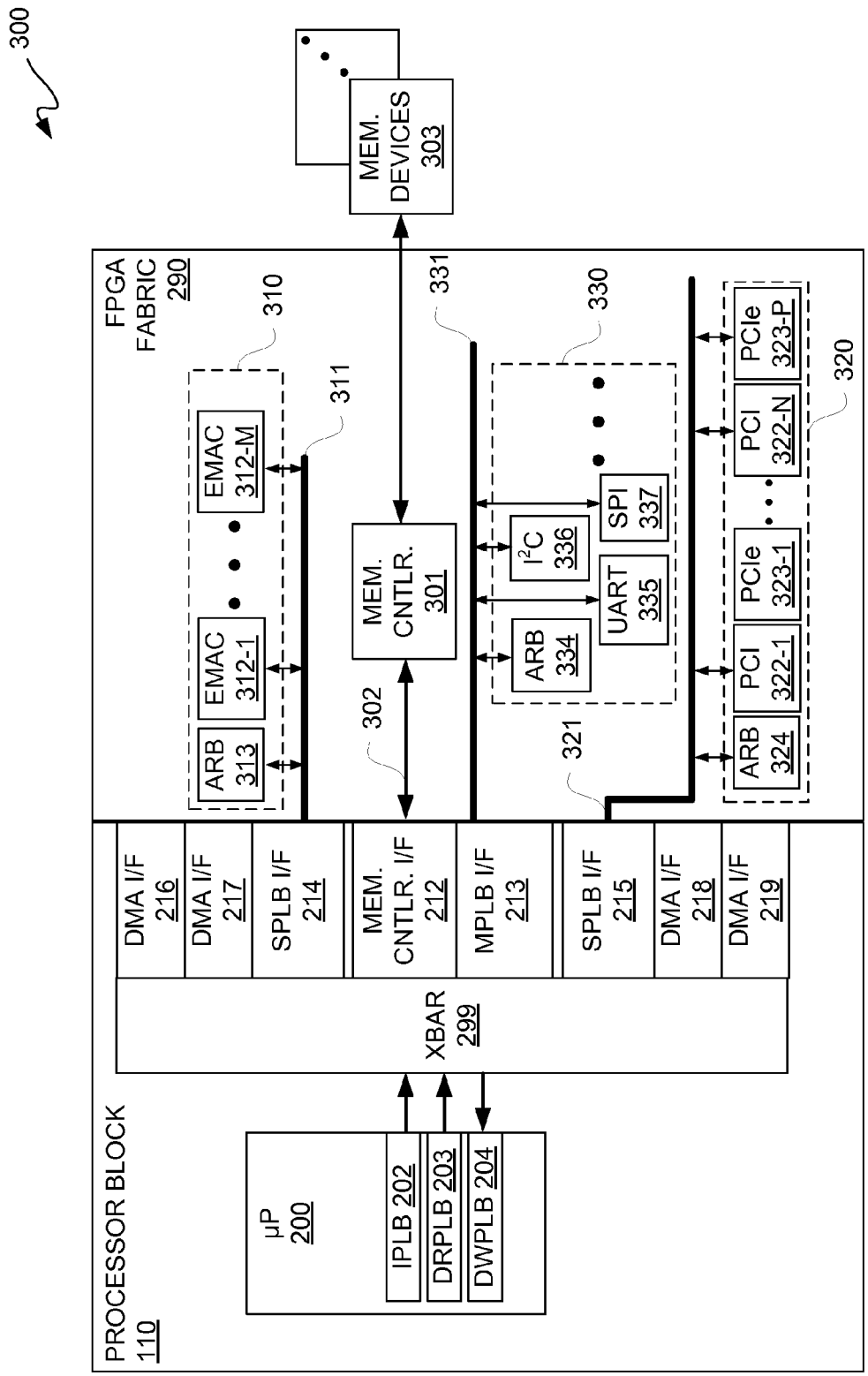
FIG. 3 is a block diagram depicting an exemplary embodiment of a system in which the processor block of FIG. 2 may be used, in accordance with an embodiment of the present invention.

FIG. 3 is a block diagram depicting an exemplary embodiment of a system 300 in which processor block 110 may be used. Processor block 110 may be coupled to a memory controller 301 instantiated in FPGA fabric 290. Accordingly, memory controller 301, or at least the portion of that circuit instantiated in programmable logic of FPGA fabric 290, may be thought of as a "soft" memory controller. Memory controller 301 may be coupled to memory controller interface 212 of processor block 110 via soft memory control interface bus 302. Buses 311, 321, and 331 may all be soft buses instantiated using PIPs of FPGA fabric 290. Memory controller 301 may be coupled to one or more memory devices 303, where such one or more memory devices 303 are either internal or external to FPGA 100.

As previously described, master devices may be instantiated in FPGA fabric 290. For example, one or more soft master devices 310 may be coupled to a soft SPLB 311 which is coupled to SPLB interface 214 of processor block 110. Soft SPLB 311 may have coupled to it one or more Ethernet media access controllers ("EMACs") 312-1 through 312-M, for M a positive integer greater than zero. There may be arbitration associated with access to SPLB 311, as indicated by arbitration block 313. EMACs 312-1 through 312-M are master devices, which in this exemplary embodiment are implemented in FPGA fabric 290 as soft master devices.

Moreover, one or more other soft, or hard, master devices 320 may be coupled to soft SPLB 321 which is coupled to SPLB interface 215. In this example, soft master devices of FPGA fabric 290 are PCI blocks 322-1 through 322-N, and PCI Express blocks 323-1 through 323-P, for N and P positive integers greater than zero. PCI blocks 322-1 through 322-N, and PCI Express blocks 323-1 through 323-P may be coupled to SPLB interface 215 via soft SPLB bus 321. An arbitration block as generally indicated by arbitration block 324 may be used to arbitrate access of PCI blocks 322-1 through 322-N and PCI Express blocks 323-1 through 323-P to SPLB 321.

As previously indicated, MPLB interface 213 is a slave device with respect to switch 211. However, MPLB interface 213 is master device with respect to slave devices coupled to soft MPLB 331. More particularly, one or more hard or soft slave devices may be coupled to soft MPLB 331. In this exemplary embodiment, soft slave devices 330, which are coupled to MPLB 331, are instantiated in FPGA fabric 290. Access to MPLB 331 may be arbitrated by an arbitration block 334. Examples of soft slave devices may include one or more instances of a UART 335, an I²C block 336, an SPI block 337, or one or more other peripheral devices.

In the exemplary embodiment previously described with respect to FIG. 2, crossbar 299 provides command pipelining in command FIFOs for up to five transactions to each of memory controller interface 212 and MPLB interface 213 corresponding to the five master transaction inputs to decoders 222 through 226 of FIG. 2. However, as previously indicated, other command queue depths may be used.

Though not illustratively shown for purposes of clarity, hard or soft devices configured for DMA access may be coupled to DMA interfaces 216 through 219 via dedicated local links 220-1 through 220-4, respectively. However, soft buses conforming to DMA protocol may be used rather than dedicated buses. Thus, for example, a hard or soft device may be coupled to a local link which is coupled to a DMA interface of DMA interfaces 216 through 219 of processor block 110 An example of such a DMA soft or hard master device includes an EMAC, a PCI or PCIe device. In embodiments, these devices are connected to the DMA interface through FIFOs and the DMA functionality is in the DMA block and not in the device.

Figure 4:
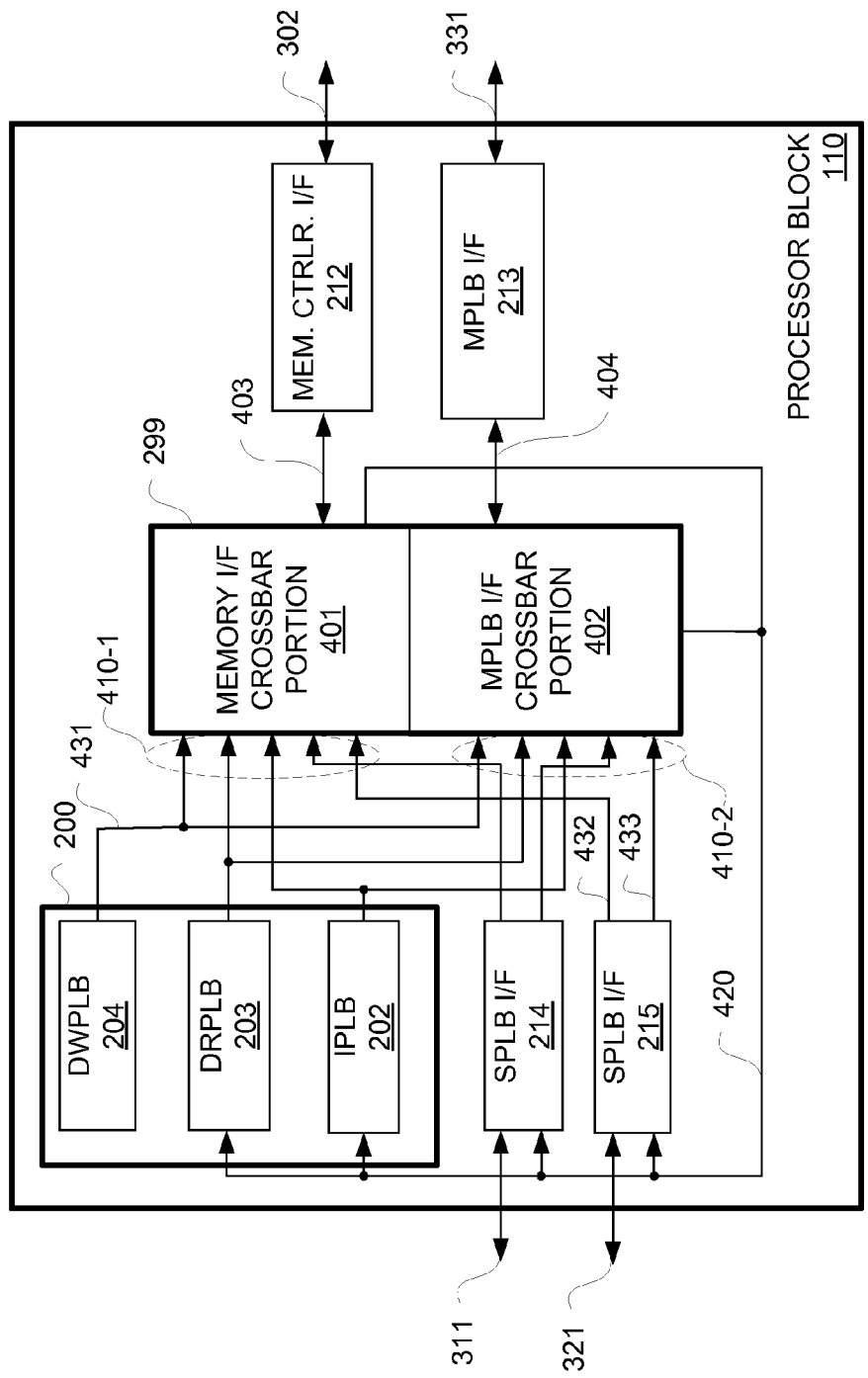
FIG. 4 is a block diagram depicting an exemplary embodiment of an interconnection for the processor block of FIGS. 2 and 3, in accordance with an embodiment of the present invention.

FIG. 4 is a block diagram depicting an exemplary embodiment of an interconnection for processor block 110 of FIG. 2. Processor block 110 is further described with simultaneous reference to FIGS. 2 and 3.

DWPLB 204, DRPLB 203, and IPLB 202 of microprocessor 200 are each coupled to memory interface crossbar portion 401 and MPLB crossbar portion 402 of crossbar 299 to provide thereto write data, address, control, and arbitration information from microprocessor 200. Additionally, SPLB interfaces 214 and 215 are each coupled to memory interface crossbar portion 401 and MPLB crossbar portion 402 to provide thereto write data, address, control, and arbitration information from one or more master devices coupled to such interfaces 214 and 215 respectively via SPLB 311 and SPLB 321.

Portions 401 and 402 have separate arbitration logic, separate read and write command queues, and common crossbar logic, all of which are described below in additional detail. So for example, switch 211 of FIG. 2 may be implemented as two switches, one for memory interface PLB 403 coupled to memory controller interface 212 and one for general purpose PLB 404 coupled to MPLB interface 213. For each of such switches, a respective arbitration block, a read command queue, and a write command queue are hardwired. Although decoders 222 through 226 are not illustratively shown in FIG. 4, it should be understood that address information has been decoded for directing a command to the appropriate location.

Each portion 401 and 402 receives write data, address, control and arbitration information, generally indicated as master device information input 410-1 and 410-2, collectively and singly information input 410. It should be appreciated that such information input 410 is from an transaction initiated by a master device, such as any of the PLB masters in the microprocessor 200 or a master device coupled to an interface of SPLB interfaces 214 and 215. Such an initiated transaction may be addressed for memory controller interface 212 or MPLB interface 213. DMA interfaces 216 through 219 are not illustratively shown for purposes of clarity and not limitation, as their interconnection shall be understood from the description herein of interconnecting SPLB interfaces 214 and 215.

The same signals sent from DWPLB 204 may be provided to both memory interface crossbar portion 401 and MPLB crossbar portion 402 via a common bus 431. Likewise, respective common buses provide signals from DRPLB 203 and IPLB 202 to both memory interface crossbar portion 401 and MPLB crossbar portion 402. In contrast, separate buses 432 and 433 respectively go from SPLB interface 215 to memory interface crossbar portion 401 and MPLB crossbar portion 402. Likewise, separate buses respectively go from SPLB interface 214 to memory interface crossbar portion 401 and MPLB crossbar portion 402.

Provided from portions 401 and 402 to SPLB interfaces 214 and 215 and to DRPLB 203 and IPLB 202 is read data, control, and address acknowledgement information. This output information 420 is from portions 401 and 402 in response to an initiated transaction or command. Thus, even though bused on a common bus, such output information 420 is directed for the initiator block by crossbar logic, such as crossbar logic 506 of FIG. 5, common to portions 401 and 402. Some of this output information 420 is internal handshaking with an initiator block, and some of this output information 420 may be the result of a completed transaction, such as data obtained via MPLB 331 or memory controller interface bus 302. Thus, for example, a completed read from memory transaction by a memory controller 301 coupled to memory controller interface bus 302 provides read data through memory controller interface 212 to memory interface PLB 403 for memory UF crossbar portion 401 for a transaction initiator block, such as microprocessor 200 or a master device coupled to an interface of SPLB interfaces 214 or 215 via SPLB 311 or 321, respectively. Thus, in response to a transaction initiated by a transaction initiator block, each of SPLB interfaces 214 and 215 and DRPLB 203 and IPLB 202 does not receive the same set of output information 420, as such output information 420 may only be provided to the specific interface associated with the transaction initiator block initiating the transaction resulting in such output information 420.

Figure 5:
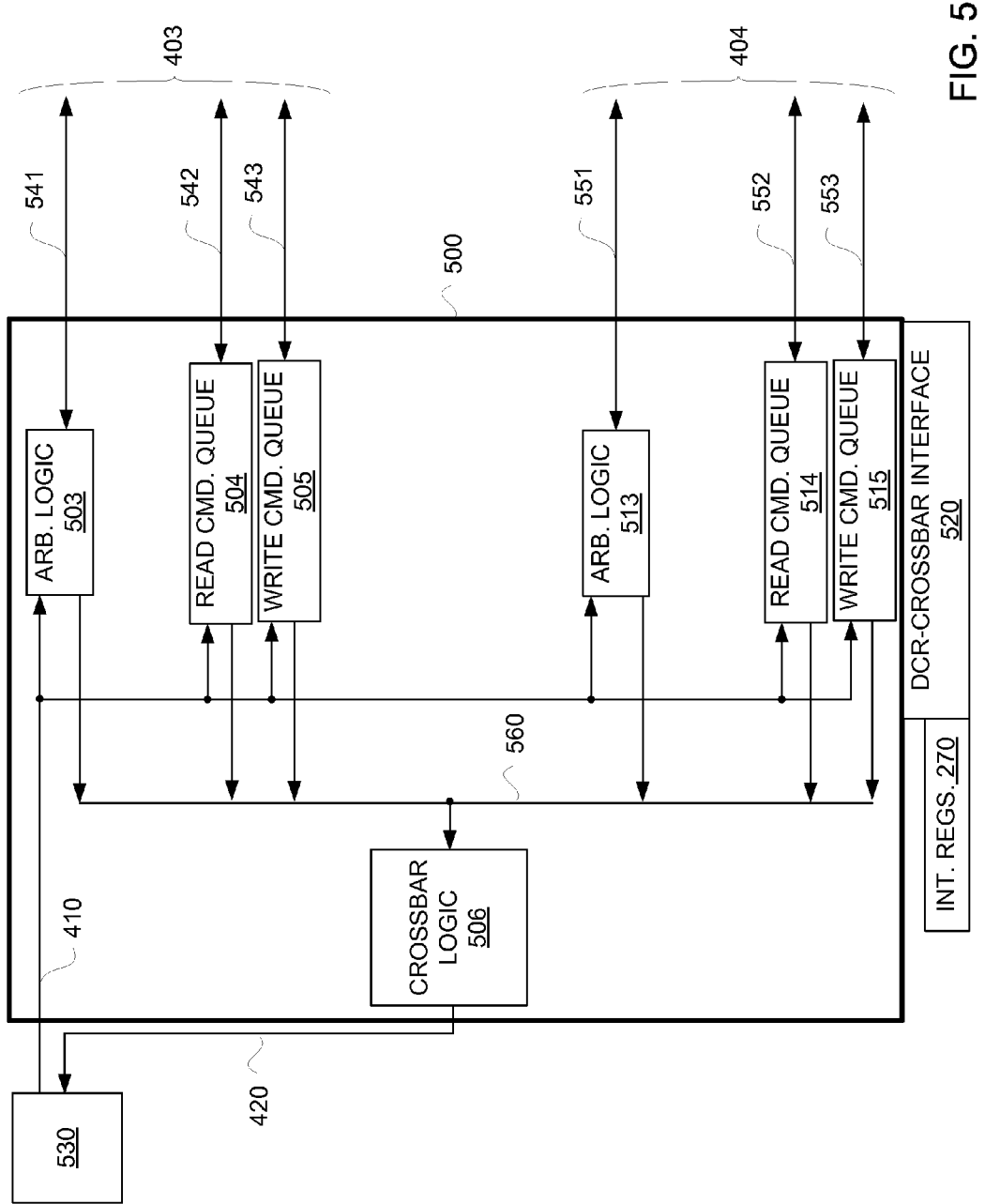
FIG. 5 is a block diagram depicting an exemplary embodiment of a crossbar structure, which may be used for a crossbar of the processor block of FIGS. 2 through 4, in accordance with an embodiment of the present invention.

FIG. 5 is a block diagram depicting an exemplary embodiment of a crossbar structure 500, which may be used for crossbar 299 of FIGS. 2 through 4. A two-stage decoding process, namely decoding to select between memory controller interface 212 and MPLB interface 213 and decoding for an address of an address map, provides flexibility to a user while simultaneously reducing the number of bits involved to decode a requested address. Crossbar structure 500 is further described with simultaneous reference to FIGS. 2 and 5.

Crossbar 299 implements address mapping for processor PLB interfaces. For a request originating from SPLB interfaces 214 and 215, SPLB interfaces 214 and 215 pre-decode the request. These SPLB interfaces 214 and 215 provide this information to crossbar 299 via a control signal. Thus, crossbar 299 does not have to decode the address again for inbound communication from for example FPGA fabric 290 in response to an initiated transaction, which improves timing since the address mapping falls on time sensitive paths. For purposes of clarity and not limitation, it shall be assumed that information input 410 includes previously decoded addresses.

A master device 530 provides information input 410 either to a set of blocks associated with memory controller interface bus 403 or a set of blocks associated with general purpose MPLB 404. Each of these sets of blocks generally includes the same circuits, namely the set associated with memory controller interface 212 includes arbitration logic 503, read command queue 504, and write command queue 505, and the set associated with MPLB interface 213 includes arbitration logic 513, read command queue 514, and write command queue 515. Arbitration logic 503, read command queue 504, and write command queue 505 are respectively associated with an address phase 541, a read data phase 542, and a write data phase 543 with respect to communication with memory controller interface 212 via memory controller interface bus 403. Arbitration logic 513, read command queue 514, and write command queue 515 are respectively associated with an address phase 551, a read data phase 552, and a write data phase 553 with respect to communication with MPLB interface 213 via general purpose MPLB 404.

A PLB protocol defines two phases of a transaction, namely an address phase and a data phase, which occur independently on separate buses. When a request is acknowledged by a slave device, namely via an interface 212 or 213, the slave device has committed to provide the data during the data phase of the transaction. A delay may occur before the data phase is started by the slave device. Multiple data phases may additionally be pipelined by slave devices in a system.

To keep track of data phases which are outstanding, crossbar 299 maintains two command queues for each arbiter, namely one for reads, namely read command queues 504 and 514, and the other for writes, namely write command queues 505 and 515. Crossbar 299 uses the information stored in the command queues to direct the slave device data phase responses to the appropriate master device and to determine if its particular transaction has been completed.

After a transaction is completed by a slave device, such as associated with memory controller interface bus 403 or MPLB 404 instantiated in FPGA fabric 290, the result of such transaction is provided back to crossbar structure 500, which may include one or more of an address phase, a read phase, and a data phase via an interface, such as MPLB interface 213 or memory controller interface 212, from which the transaction was provided to FPGA fabric 290. However, output from the set of arbitration logic 503, read command queue 504, and write command queue 505 and the set of arbitration logic 513, read command queue 514, and write command queue 515 is commonly bused via output bus 560 for input to crossbar logic 506.

Output of crossbar logic 506 is output information 420, which is provided to master device 530. Each arbitration logic module, namely arbitration logic 503 and 513, of arbiter 221 may generate its own set of arbitration mask signals with respect to master device signals. These mask signals may be combined together, such as with OR gate logic, for providing output information 420 to the correct transaction-initiating master device 530. Thus, crossbar logic 506 combines mask signals from a memory interface arbiter and an MPLB arbiter respectively of arbitration logic 503 and 513, and steers the resulting output to a requesting master device. When a master device, whether microprocessor 200 or a master device instantiated in FPGA fabric 290 for example, coupled to crossbar 299 requests a transaction to be performed, the identity of the requesting master device (202, 203, 204, 214 or 215) is temporarily stored with any other stored identities, in memory controller interface 212 or MPLB interface 213 depending on the transaction. The stored identity of a requesting master device may be used to steer returned data or control information, resulting from execution of such a transaction, to the requesting master device. The master device identity may be used to generate mask bits that control this steering.

Read and write command queues facilitate pipelining read and write data phases. For purposes of clarity by way of example and not limitation as previously described, read and write command queues may each be five deep and hence up to five read and four write data phases may be outstanding for any slave bus, namely buses 403 and 404. Of course even though the example depth of such command queues is five, other depths less than or greater than five may be used. If a master device issues a transaction which has or is granted access to crossbar 299, crossbar 299 arbitrates via arbitration logic 503 or 513, respectively, between such transaction and one or more other transactions from other master devices requesting use of a same interface of interfaces 212 and 213, respectively. A winner is ascertained within the same clock cycle and the request is put out on the slave address bus, and the byte enable ("BE") and size transfer qualifiers are pushed into a crossbar command FIFO, namely a read or write command queue as described above. Once a data phase of a transaction has been completed, the command FIFO is popped and used to steer the transaction response signals from the slave device to the correct master device for the next command.

Crossbar structure 500 may be coupled to DCR-crossbar interface 520. As previously described, internal registers 270, which may be coupled to crossbar structure 500, may be set to configure crossbar 299, as well as interfaces 298.

As previously described, crossbar 299 allows one or more PLB master devices coupled to processor block 110 or microprocessor 200 internal to processor block 110 to read and write to any memory mapped location in a chip in which processor block 110 is implemented, such as FPGA 100 of FIG. 1. In the following description, features of crossbar 299 are described in additional detail. These features include command pipelining, flushing posted writes, and busy signal propagation, including busy signal propagation with a synchronous attribute. For purposes of clarity and not limitation, master devices have been limited in the following description to microprocessor 200 and as being coupled to crossbar 299 via SPLB interfaces 214 and 215. However, in the following description, it should be understood that one or more master devices may be coupled via DMA interfaces 216 through 219, even though master devices instantiated in FPGA fabric 290 for example are described in terms of being coupled via SPLB interfaces 214 and 215.

As previously described, crossbar 299 includes two separate portions 401 and 402, namely an arbiter and switch portion for memory controller interface 212 and an arbiter and switch portion for MPLB interface 213. These two portions for interfaces 212 and 213 are to support concurrent operations. In an early address acknowledgement mode, namely where arbiter 221 provides an acknowledgement to a requesting master device for either memory controller interface 212 or MPLB interface 213, depending on which of those interfaces the request is directed to, the address acknowledgement may be asserted on the same cycle as the request.

To determine whether a request is for memory controller interface 212 or for MPLB interface 213, it may be determined whether the address associated with the request is mapped to memory space for one of those two interfaces. Furthermore, on the same cycle as the early address acknowledge assertion, arbitration may be decided and the winning command, if more than two commands are present, is put into an output command queue, as previously described with reference to FIG. 5, and a PLB address valid signal is asserted, as described below in additional detail.

Thus, for example, if multiple master devices request access to crossbar 299 during a same cycle, all requesting master devices may receive an early address acknowledgement during that cycle. Arbiter 221 then decides the order of execution of the multiple commands, and places each command in the determined order into a command queue.

To prevent simultaneous data phases for a master in the same direction, data phase ordering is done by blocking access to a slave bus when the other slave bus has a command pending in the same direction. This may occur when a command queue for one of interfaces 212 and 213 is full and a command queue for the other one of interfaces 212 and 213 is not full. Requests to the same slave bus are not blocked if they are pending requests in the same direction. Ordering may be maintained in a command queue, such as in one of command queues 504, 505, 514, and 515.

Transactions from the same master in the opposite direction to the pending transfer are not blocked from being issued to the other slave bus. While a master is blocked from arbitration consideration due to ordering, crossbar 299 may arbitrate normally with the blocked master and grant access to the highest priority master. Two arbiters within arbiter 221, namely one for interface 212 and the other for interface 213, communicate with each other. This communication includes use of busy signaling as described in additional detail with reference to FIG. 6.

Figure 6:
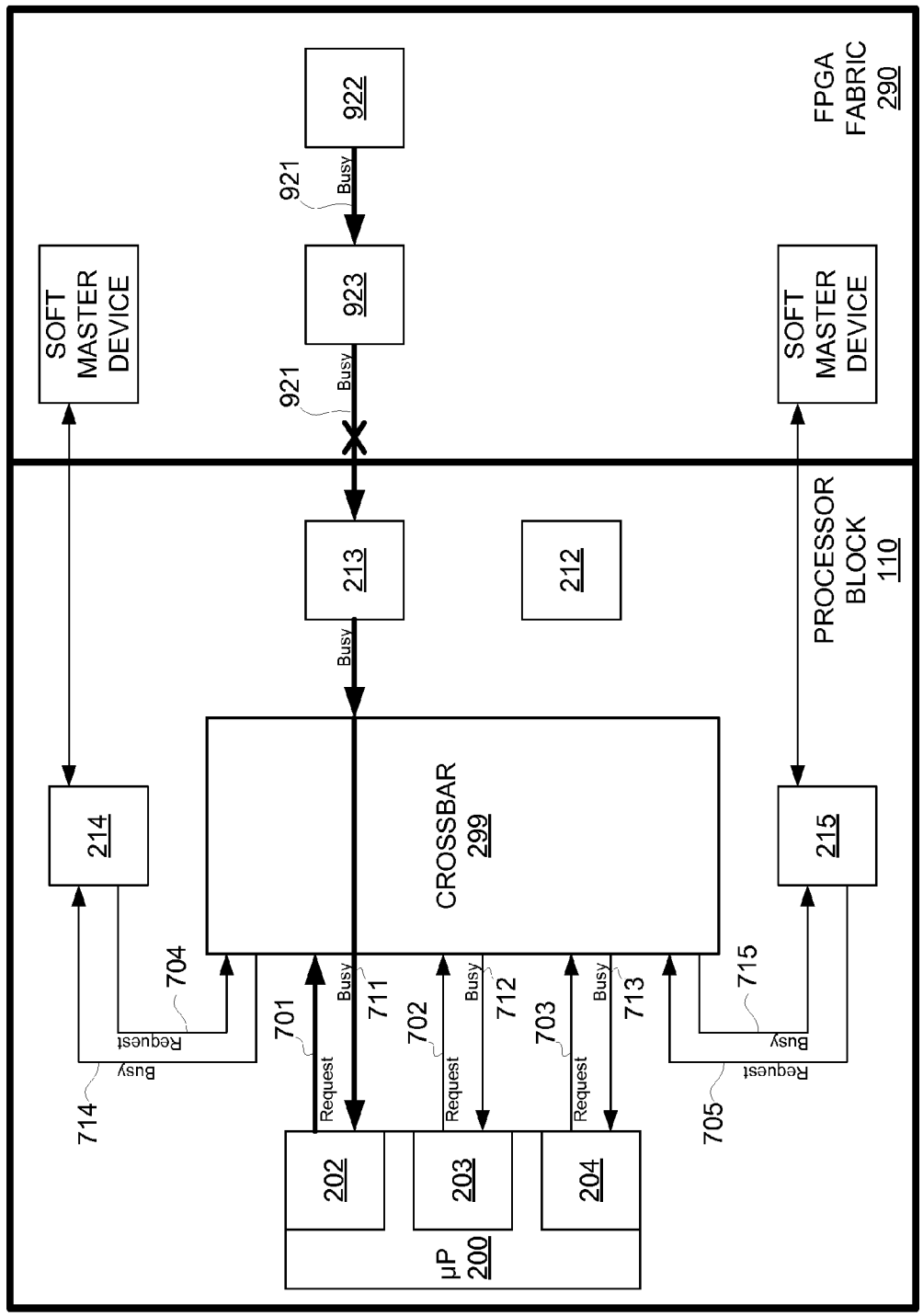
FIG. 6 is a block diagram depicting an exemplary embodiment of busy signaling to the crossbar of the processor block of FIGS. 2 through 4 for a non-synchronous transaction, in accordance with an embodiment of the present invention.
Figure 7:
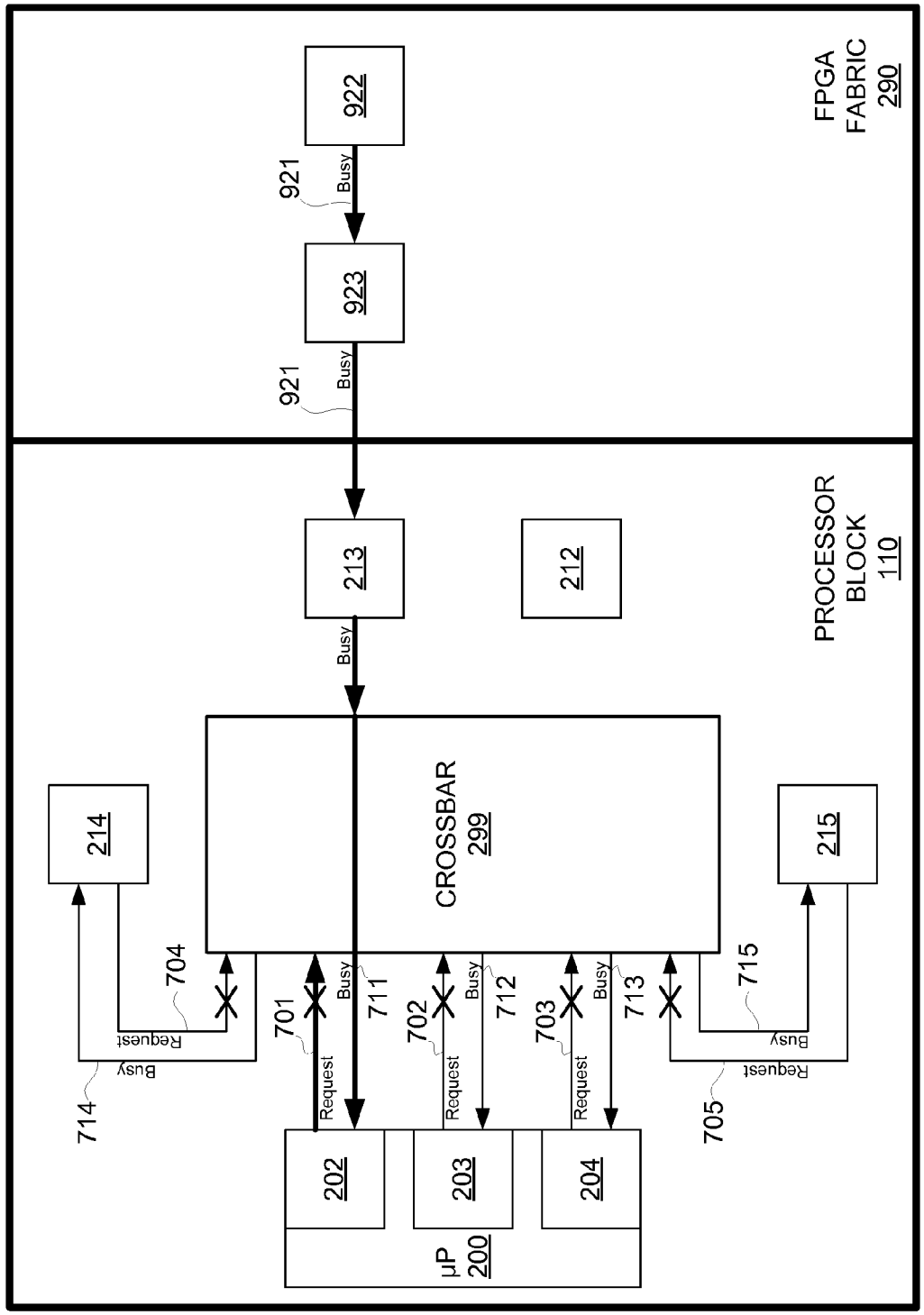
FIG. 7 is a block diagram depicting an exemplary embodiment of busy signaling to the crossbar of the processor block of FIGS. 2 through 4 for a synchronous transaction, in accordance with an embodiment of the present invention.

FIG. 6 is a block diagram depicting an exemplary embodiment of busy signaling to crossbar 299. Busy signaling of FIGS. 6 and 7 are described herein with simultaneous reference to FIGS. 2 through 5. SPLB interfaces 214 and 215 may be thought of as respective bidirectional FPGA fabric 290-to-crossbar 299 bridges. Likewise, MPLB interface 213 may be thought of as a bidirectional crossbar 299-to-FPGA fabric 290 bridge. Furthermore, for an FPGA implementation having BRAM, it should be appreciated that MPLB interface 213 allows masters or master devices to access fabric slaves such as BRAM controllers, VGA modules, and the like. Accordingly, it should be appreciated that busy signals may be used to notify an arbiter about a master and direction of any pending transfers. An arbiter may then block arbitration of transactions from any masters with pending transfers in the same direction on the other arbiter.

In this exemplary embodiment, there may be up to seven busy signals sent from each of arbiters forming arbiter 221 (not shown in FIG. 6). These arbiters are referenced as arbitration logic 503 and arbitration logic 513 of FIG. 5. Busy signals 711 through 713 are respectively provided to IPLB 202, DRPLB 203, and DWPLB 204 to respectively indicate whether memory controller interface 212 or MPLB interface 213. or both, is or are busy, depending on where a requested transaction originated from microprocessor 200. Likewise, busy signals 714 and 715 may be respectively sent to SPLB interface 214 or 215. Busy signal 714 is used to generally indicate both a write busy signal and a read busy signal, namely two separate busy signals, and busy signal 715 is used to generally indicate both a write busy signal and a read busy signal, again namely two separate busy signals. Thus, for each of SPLB 214 and 215, there may be separate read and write busy signals provided from crossbar 299, which are not shown for purposes of clarity and not limitation. Thus, crossbar 299 is capable of sending respective busy signals 711 through 715 to IPLB 202, DRPLB 203, DWPLB 204, SPLB 214, and SPLB 215 for either or both of interfaces 212 and 213, where connections for memory controller interface 212 have been omitted for purposes of clarity.

For example, a busy signal 921 may be asserted by a slave device 922 instantiated in FPGA fabric 290. This busy signal 921 may be propagated to an arbiter 923 instantiated in FPGA fabric for communication of such busy signal 921 to MPLB interface 213. Busy signal 921 may be passed via MPLB interface 213 to crossbar 229 and passed via crossbar 299 along as busy signal 711 to a portion of a PLB interface of microprocessor 200, such as IPLB 202 in this example.

Each of IPLB 202, DRPLB 203, DWPLB 204, SPLB 214, and SPLB 215 is capable of passing along a request signal, namely respectively request signals 701 through 705, to crossbar 299 to request access to either or both of interfaces 212 and 213 for performance of transactions. A master may want to be notified when a particular write transaction retires all the way to the target in FPGA fabric 290 or memory device. A slave may so notify the master by asserting its busy signal for that master. The slave may continue to assert its busy signal for a transaction even after its data phase is completed on a PLB. Crossbar 299 may therefore indicate that a transaction has not been completed until it hears back from the target destination that such transaction has been completed by asserting a busy signal. For a non-synchronous transaction passed from either of interfaces 212 and 213 to crossbar 299, a busy signal 921 is based on a transaction having been completed by a slave device 922 instantiated in FPGA fabric 290 as indicated in FIG. 6. Accordingly, busy signal 921 may be ignored for a subsequent transaction, as generally indicated by an X.

FIG. 7 is a block diagram depicting an exemplary embodiment of busy signaling to crossbar 299 for a synchronous transaction. On a synchronous ("sync") transaction request from a master having gained access to crossbar 299, such as by winning an arbitration, crossbar 299 blocks subsequent requests from all other masters until the sync transaction and all transactions preceding it in the outgoing queue have been completed.

For purposes of clarity by way of example and not limitation, such sync transaction is described with reference to MPLB interface 213, but it should be appreciated memory controller interface 212 may be used. Thus, for this example, crossbar 299 blocks subsequent requests from all other masters until the sync transaction and all transactions preceding it in FIFO 261 of MPLB interface 213 have been completed. This ensures, for example, that busy signal 921 from fabric slave device 922 to a requesting master device is de-asserted for the sync transaction completion, as no other transaction may be pipelined behind it. The blocking takes place after the master device requesting the sync transaction has won arbitration, for example, for access to an interface, such as either of interfaces 212 and 213, via crossbar 299.

Busy signal 711 to microprocessor 200 requesting a sync attribute transaction may be asserted until the slave destination de-asserts its busy signal 921. Thus, fabric busy signal 921 from soft arbiter 923 is propagated through crossbar 299 during a sync transaction to all master devices to indicate that the interface, such as either of interfaces 212 and 213, used to process the sync transaction is busy. The blocking of other requests by other masters as well as the master device requesting the sync transaction is generally indicated in FIG. 7 with an X on each of request signals 701 through 705. Even though the master device requesting the sync transaction in the example of FIG. 7 is microprocessor 200, it should be understood that a master requesting a sync transaction may be coupled to one of SPLB interfaces 214 or 215 or be part of the PLB interface of microprocessor 200.

A system may use posted writes to a target such that they are always queued ahead of any subsequent reads to that target. The read may obtain the posted write data which ensures that each master in the system has a consistent view of such data. The order of the read after the posted write may be set in order to ensure data consistency. Processor block 210 orders all transactions accepted by crossbar 299. However, there is no ordering between a posted write in an SPLB interface and a read from a PLB interface of microprocessor 200 or from an SPLB interface of another master device. Crossbar 299 ensures that a read from any master to a slave bus is ordered to execute after such SPLB interface posted writes to the same slave bus are queued within crossbar 299. Once within the crossbar queue, transactions are set in order through the rest of processor block 110.

Figure 8:
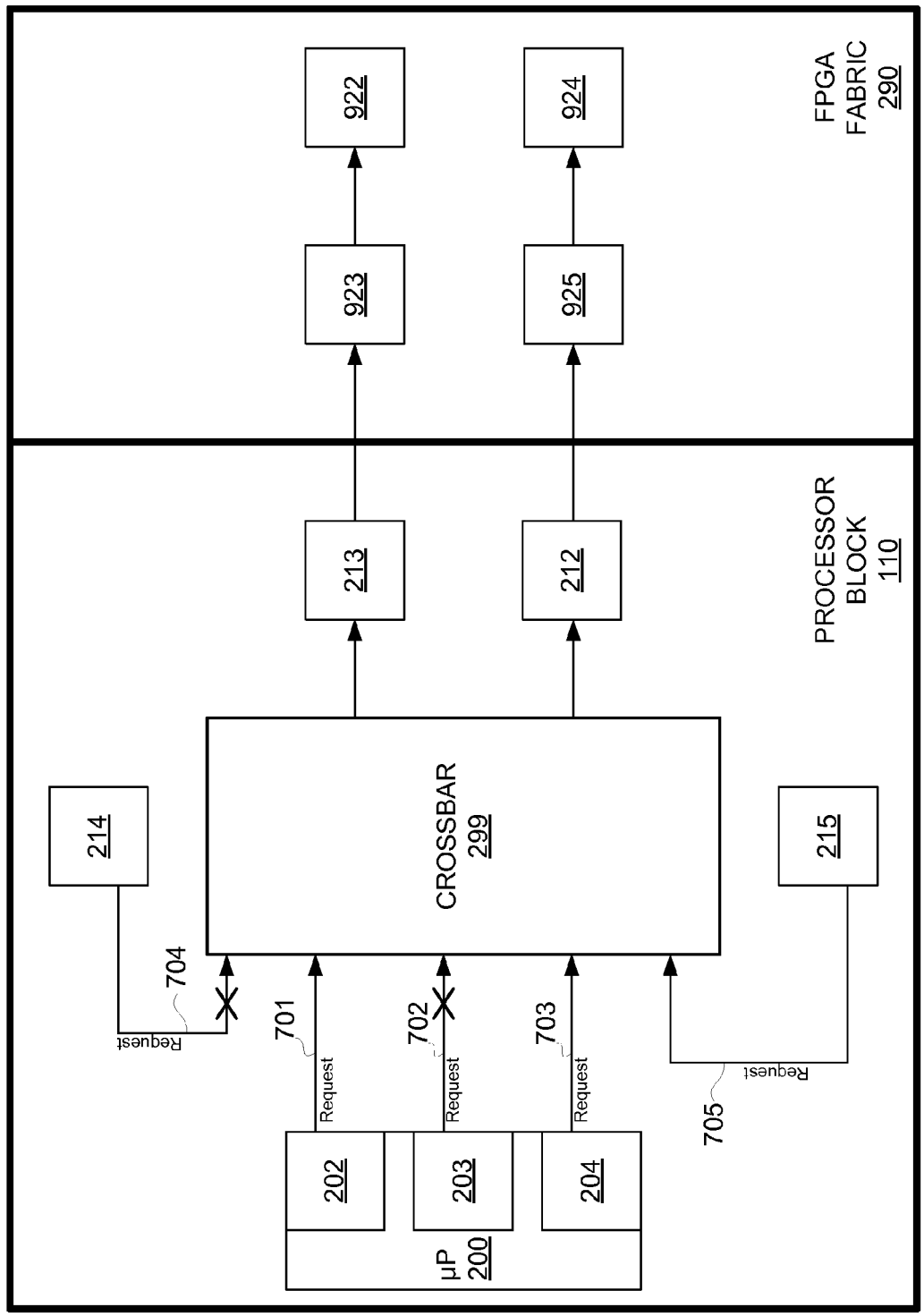
FIG. 8 is a block diagram depicting an exemplary embodiment of flush posted write signaling to the crossbar of the processor block of FIGS. 2 through 4, in accordance with an embodiment of the present invention.

FIG. 8 is a block diagram depicting an exemplary embodiment of flush-posted-write(s) signaling to crossbar 299. Processor block 110 includes a configuration bit for each PLB, namely IPLB 202, DRPLB 203, and DWPLB 204, that may be individually turned on to turn on a flush-posted-writes-before-read mode, and each SPLB interface, namely SPLB interfaces 214 and 215, has a flush-posted-writes-before-read mode bit that may be individually set to turn on a flush-posted-writes-before-read mode. In FIG. 8, arrows indicate the direction of transaction initiation, and not necessarily data flow. The flush-posted-write(s)-before-read mode flows of FIGS. 9 and 10 are described below with simultaneous reference to FIG. 8.

Figure 9:
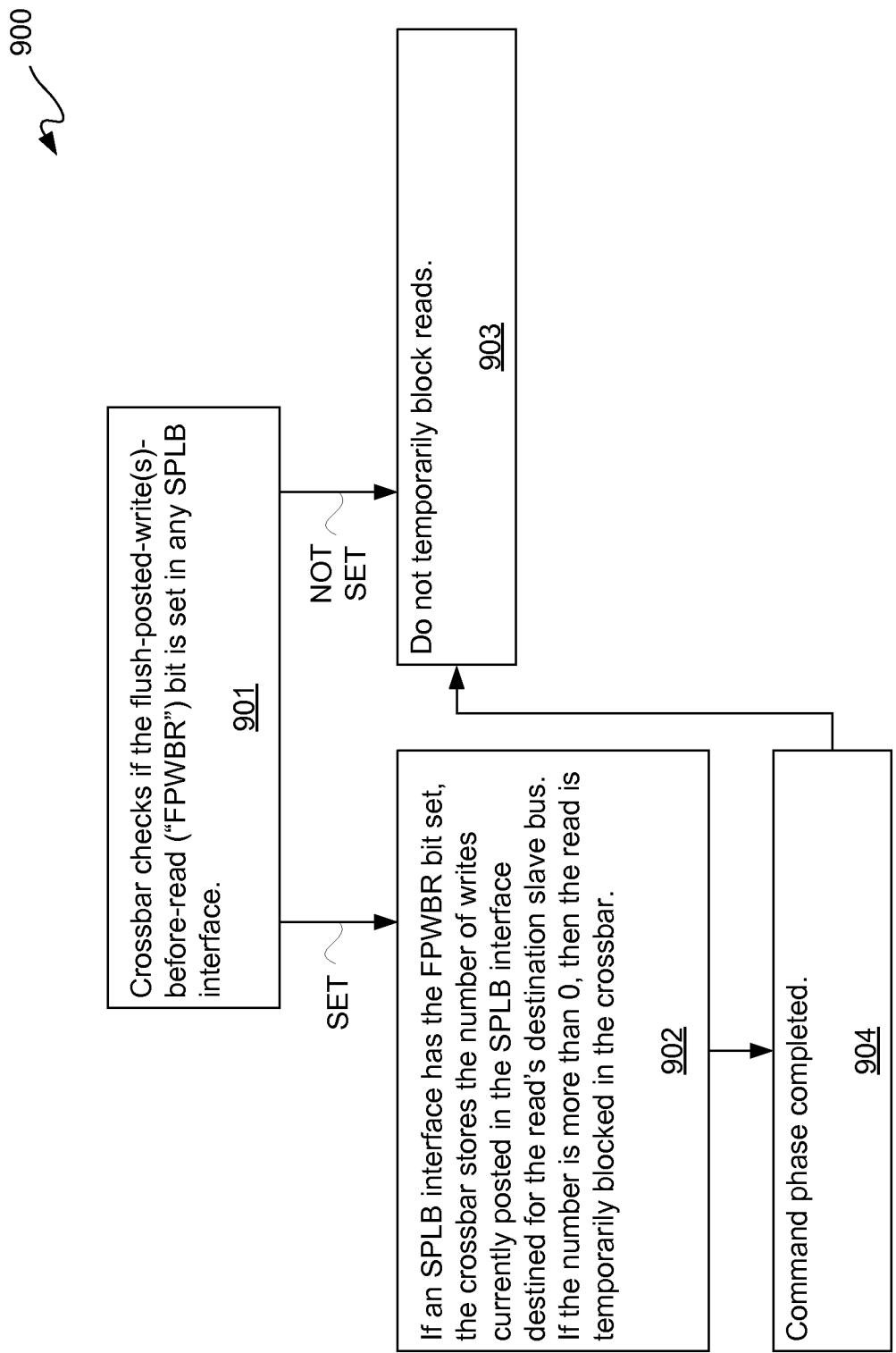
FIG. 9 is a flow diagram depicting an exemplary embodiment of a flush-posted-write(s)-before-read ("FPWBR") mode flow for reads initiated by a microprocessor of the processor block of FIGS. 2 through 4, in accordance with an embodiment of the present invention.
Figure 10:
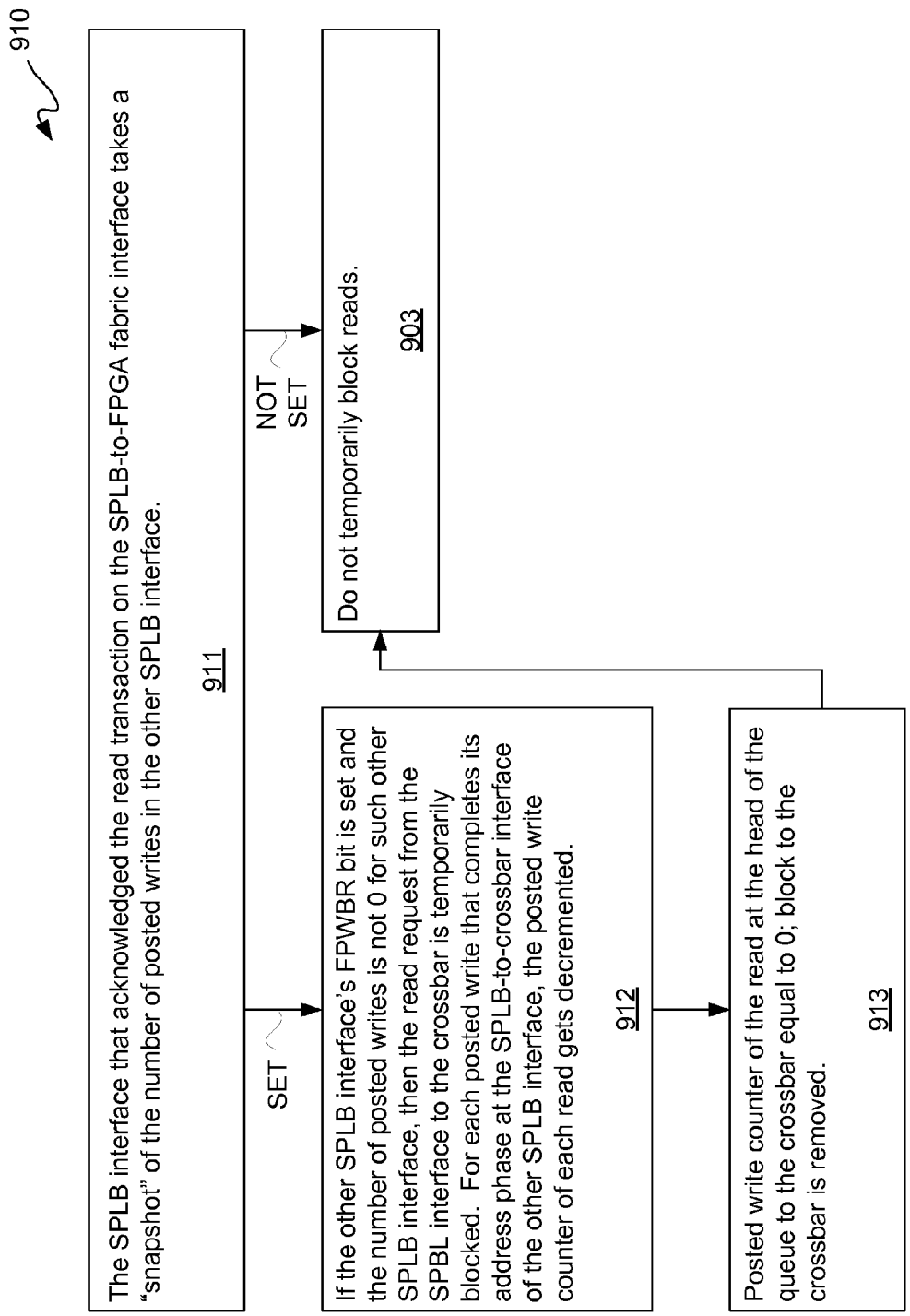
FIG. 10 is a flow diagram depicting an exemplary embodiment of a FPWBR mode flow for reads initiated by a master device coupled via an slave processor logic block ("SPLB") interface of the processor block of FIGS. 2 through 4, in accordance with an embodiment of the present invention.

FIG. 9 is a flow diagram depicting an exemplary embodiment of a flush-posted-write(s)-before-read ("FPWBR") mode flow 900 for reads initiated by microprocessor 200. For reads from microprocessor 200, crossbar 299 checks at 901 if the configuration bit for a flush-posted-writes-before-read mode ("FPWBR bit") is set in any SPLB interface, such as SPLB interface 214 or 215.

At 902, if an SPLB interface 214 or 215 has the FPWBR bit set, crossbar 299 stores the number of writes currently posted in the SPLB interface targeted for the read's destination slave device, such as a slave device instantiated in FPGA fabric 290 coupled to either of interfaces 212 or 213. In other words, crossbar 299 takes a "snapshot" of the number of posted writes. If the number is more than 0, then the read is temporarily blocked in crossbar 299.

A read may thus temporarily be blocked until all the posted writes in the snapshot are accepted by crossbar 299. Reads to either slave bus, namely either of interfaces 212 or 213, are blocked based on the destination bus, namely either of interfaces 212 or 213, of the posted writes. Thus, a posted write to memory controller interface 212 does not block a read to MPLB interface 213, and vice versa. The read is blocked until the SPLB has completed the command phases of the stored number of posted writes to the read's destination slave bus at the SPLB-to-crossbar interface, as determined at 904.

If at 901 it is determined that the FPWBR bit is not set for a write of an associated SPLB interface, or if the command phase is completed as determined at 904, then the read is not blocked or no longer blocked, respectively, at 903. Posted writes may be generally thought of as write transactions which have completed their data phase on the FPGA fabric 290 side of a PLB/SPLB, such as IPLB 202, DRPLB 203, DWPLB 204, SPLB interface 214, and SPLB interface 215. Posted writes occurring before a read may be generally thought of as the posted writes that occurred before the read request was asserted and not when it was acknowledged.

If a posted write and a read request occur at the same time, the posted write is not taken into consideration, namely the read is not blocked if it occurred before or at the same time as the posted write. If a master requesting a read has locked the bus and another master cannot flush its posted writes, then a deadlocked situation may occur since both masters are waiting on each other. Crossbar 299 may overcome such a deadlock by not blocking reads for posted writes when the read is a locked transaction.

FIG. 10 is a flow diagram depicting an exemplary embodiment of a flush-posted-write(s)-before-read ("FPWBR") mode flow 910 for reads initiated by a master device coupled via an SPLB interface, such as SPLB interfaces 214 and 215. For purposes of clarity by way of example and not limitation, it shall be assumed that a read is initiated from SPLB interface 214.

At 911, the SPLB interface that acknowledged the read transaction on the SPLB-to-FPGA fabric interface, namely SPLB interface 214 for the example, takes a "snapshot" of the number of posted writes in the other SPLB interface, namely SPLB interface 215 for the example. If the FPWBR bit of SPLB interface 215 is set and the number of posted writes is not 0 for SPLB interface 215, then the read request from SPLB interface 214 to crossbar 299 is temporarily blocked at 912.

For each posted write that completes its address phase at the SPLB-to-crossbar interface of the other SPLB interface, the posted write counter of each read gets decremented, also at 912. When the posted write counter of the read at the head of the queue to the crossbar becomes 0 as determined at 913, SPLB interface's 214 block to crossbar 299 is removed at 913. If at 911 it is determined that the FPWBR bit is not set for a write of an associated SPLB interface, or if the command phase is completed as determined at 913, then the read is not blocked or no longer blocked, respectively, at 903.

Returning to FIG. 8 where an FPWBR mode 910 is illustratively depicted, SPLB interface 215 has its FPWBR bit set and contains posted writes to memory controller interface, as generally indicated by request signal 705. Respective read requests from SPLB interface 214 and DRPLB 203 for memory controller interface 212, as generally indicated by request signals 702 and 704, respectively, are blocked as indicated by X's, until the previously posted writes in SPLB interface 215 to memory controller interface 212 have been completed, namely "flushed." SPLB interface 214 has checked and determines that FPWBR bit of SPLB interface 215 is set and SPLB interface 215 contains one or more posted writes that have not been flushed. After taking this "snapshot" as described above, SPLB interface 214 blocks its own read request to crossbar 299 until all the previously posted writes in SPLB interface have been flushed, namely completed their address phase at the SPLB interface 215 to crossbar 299 interface. Similarly, microprocessor 200 reads for memory controller interface 212 are blocked within crossbar 299 until all the previously posted writes in an SPLB interface have been flushed, as indicated by an X for request 702 from DRPLB 203. However, respective read requests from IPLB 202 and DRPLB 203 for MPLB interface 213 in this depiction are not blocked by crossbar 299.

There may be posted writes within MPLB interface 213 or memory controller interface 212 as well, but a read will not retire before a posted write ahead of it in a MPLB interface 213 or memory controller interface 212 command queue because a unified read/write command FIFO within each of MPLB interface 213 and memory controller interface 212 naturally orders the issue of commands, and the target slave device coupled thereto thus receives the commands in the correct order. In other words, there are no separate read and write command queues in MPLB interface 213 and memory controller interface 212, but rather a single unified command queue in each. Additionally, the target slave device coupled to MPLB interface 213 or memory controller interface 212 is guaranteed to complete the data phases of read and writes in the order that it receives the corresponding command.

Crossbar 299 does not attend to posted writes after the read has been acknowledged, because those requested writes were not posted before the read was acknowledged. The configuration bit to turn on the FPWBR mode located in an SPLB interface may be set via a memory cell attribute during a reset or with a DCR write transaction.

While the foregoing describes exemplary embodiment(s) in accordance with one or more aspects of the invention, other and further embodiment(s) in accordance with the one or more aspects of the invention may be devised without departing from the scope thereof, which is determined by the claim (s) that follow and equivalents thereof. Claim(s) listing steps do not imply any order of the steps. Trademarks are the property of their respective owners.

The invention claimed is:

1. A method for a flush-posted-write(s)-before-read mode, comprising:
setting a first mode bit for the flush-posted-write(s)-before-read mode in a first processor block interface coupled to programmable fabric and coupled to a crossbar switch device;
setting a second mode bit for the flush-posted-write(s)-before-read mode in a second processor block interface coupled to the programmable fabric and coupled to the crossbar switch device;
sending at least one write command from a transaction initiating device instantiated using the programmable fabric to the first processor block interface;
posting the at least one write command in the first processor block interface;
storing the at least one write command received in a command queue of the crossbar switch device;
sending a read command initiated by a microprocessor to the crossbar switch device;
wherein the at least one write command has an address overlap with the read command with respect to a destination target accessible through the first processor block interface to the crossbar switch device interface; and temporarily blocking the read command in the crossbar switch device until a command phase of the at least one write command is completed, wherein the temporarily blocking of the read command is activated by the first mode bit being set for the flush-posted-write(s)-before-read mode;

wherein the posting the at least one write command in the first processor block interface occurs while the first mode bit is set.

2. The method according to claim 1, wherein the first processor block interface, the second processor block interface, the crossbar switch device, and the microprocessor are all part of a processor block Application Specific Integrated Circuit core embedded in a host programmable device having the programmable fabric.

3. The method according to claim 2, wherein the destination target includes the second processor block interface coupled to the crossbar switch device and included as part of the processor block Application Specific Integrated Circuit core.

4. The method according to claim 3, wherein the second processor block interface is for coupling to one or more slave devices for access by the microprocessor and the transaction initiating device, at least a portion of the one or more slave devices being instantiated in the programmable fabric.

5. The method according to claim 2, wherein the destination target includes a memory controller interface coupled to the crossbar switch device and included as part of the processor block Application Specific Integrated Circuit core.

6. The method according to claim 1, further comprising:
locking the crossbar switch device for another read command; and
not temporarily blocking the other read command until the command phase of the at least one write command is completed to avoid a deadlock condition.

7. The method according to claim 1, further comprising:
issuing another read command during a same cycle the at least one write command is issued; and
not temporarily blocking the other read command until the command phase of the at least one write command is completed to avoid a deadlock.

8. A method for a flush-posted-write(s)-before-read mode, comprising:
setting a first mode bit for the flush-posted-write(s)-before-read mode in a first processor block interface;
not setting a second mode bit for the flush-posted-write(s)-before-read mode in a second processor block interface;
sending at least one write command from a first transaction initiating device to the first processor block interface via programmable interconnects;
storing the at least one write command in a command queue of the first processor block interface;
sending the at least one write command from the first processor block interface to a crossbar switch device coupled thereto;
sending a read command from a second transaction initiating device coupled to the crossbar switch device via the second processor block interface;
storing the read command received in a command queue of the second processor block interface;
wherein the at least one write command stored in the command queue of the first processor block interface has an address overlap with the read command stored in the command queue of the second processor block interface with respect to a destination target; and temporarily blocking the read command in the second processor block interface until a command phase of the at least one write command is completed, wherein the temporarily blocking of the read command is activated by the first mode bit being set in the first processor block interface for the flush-posted-write(s)-before-read mode; and wherein the at least one write command in the first processor block interface is allowed to be posted when the first mode bit is set.

9. The method according to claim 8, further comprising:
determining completion of the command phase of the at least one write command by the second processor block interface by,
identifying a number of posted writes including the at least one write command and any other write commands in the command queue of the first processor block interface having been posted before the read command; and
for each of the number of posted writes having completed an address phase with respect to a boundary of the first processor block interface and the crossbar switch device, decrementing a posted write counter for the read command.

10. The method according to claim 9, wherein the determining further includes:
indicating by the posted write counter for the read command that the number of posted writes remaining to complete the address phase is zero; and
removing the blocking of the read command.

11. The method according to claim 9, wherein the first processor block interface, the second processor block interface, and the crossbar switch device are all part of a processor block Application Specific Integrated Circuit core embedded in a host programmable device having programmable fabric including the programmable interconnects.

12. An integrated circuit, comprising:
a first microprocessor block interface configured to receive and to post at least one write command from a transaction initiating device; and
a crossbar switch device comprising a command queue coupled to the first microprocessor block interface, the command queue configured to store the at least one write command;
wherein the crossbar switch device is configured to temporarily block a read command initiated from a microprocessor when either a first mode bit of a first processor local bus or a second mode bit of a second processor local bus is set to activate a flush-posted-write(s)-before-read mode respectively therefor;
wherein the at least one write command has an address overlapping with the read command with respect to a destination target; and
wherein the first microprocessor block interface is configured to post the at least one write command when either the first mode bit or the second mode bit is set.

13. The integrated circuit according to claim 12, wherein the first microprocessor block interface, the crossbar switch device, and the microprocessor are all part of a processor block Application Specific Integrated Circuit core embedded in a host programmable device having a programmable fabric.

14. The integrated circuit according to claim 13, wherein the destination target includes a second microprocessor block interface coupled to the crossbar switch device and included as part of the processor block Application Specific Integrated Circuit core.

15. The integrated circuit according to claim 14, wherein the second microprocessor block interface is coupled to one or more slave devices to be accessed by the microprocessor and the transaction initiating device, at least a portion of the one or more slave devices being instantiated in the programmable fabric.

16. The integrated circuit according to claim 13, wherein the destination target includes a memory controller interface coupled to the crossbar switch device and included as part of the processor block Application Specific Integrated Circuit core.

17. The integrated circuit according to claim 12, wherein the crossbar switch device is configured to not temporarily block another read command until the command phase of the at least one write command is completed to avoid a deadlock condition.

18. The integrated circuit according to claim 17, wherein the crossbar switch device is configured to not temporarily block the other read command if the other read command is issued during a same cycle as the at least one write command.

* * * * *